United States Patent [19]
Barefoot

[11] Patent Number: 5,864,111
[45] Date of Patent: Jan. 26, 1999

[54] METHOD AND DEVICE FOR CONTROLLING PIPE WELDING

[76] Inventor: Byron G. Barefoot, 8432 Quarry Rd., Manassas, Va. 20110

[21] Appl. No.: 862,481

[22] Filed: May 23, 1997

[51] Int. Cl.$^6$ .................................................. B23K 9/167
[52] U.S. Cl. ............................................... 219/61; 219/74
[58] Field of Search .................................... 219/74, 60 A, 219/60 R, 61, 160; 228/219

[56] References Cited

U.S. PATENT DOCUMENTS

| | | | |
|---|---|---|---|
| 3,614,378 | 10/1971 | Goodell et al. | 219/61 |
| 4,723,064 | 2/1988 | Bothe, II | 219/160 |
| 5,304,776 | 4/1994 | Buerkel et al. | 219/74 |
| 5,396,039 | 3/1995 | Chevrel et al. | 219/74 |
| 5,425,492 | 6/1995 | Thode | 219/74 |
| 5,597,109 | 1/1997 | Ohmi et al. | 228/219 |

Primary Examiner—Clifford C. Shaw
Attorney, Agent, or Firm—Harold H. Dutton, Jr.

[57] ABSTRACT

A method and device for welding pipe onto a piping network at a joint comprising introducing an inert purging gas under pressure at a substantially constant flow rate at one end of the pipe away from the weld joint, providing a flow restriction at the end of the piping network away from the weld joint, diverting a minor portion of the inert purging gas flowing through the piping network into and through a constant back pressure maintaining device for maintaining a substantially constant back pressure on the inert purging gas in the piping network during the welding, whereby any changes in back pressure occurring in the piping network cause a greater or lesser amount of the inert purging gas to flow through the constant back pressure maintaining device, thereby enabling production of precise and highly reproducible welds with an orbital welder.

18 Claims, 4 Drawing Sheets

METHOD AND DEVICE FOR CONTROLLING PIPE WELDING

This invention relates to a method and device for controlling the welding of pipe. More particularly, the invention relates to a method and device for controlling an arc welding process in such a manner as to produce very consistent, high quality and reproducible welds in pipes, particularly in long lengths of pipelines or piping networks, such as are often produced in manufacturing facilities for carrying gas and liquid products throughout the facility. The invention is especially applicable in orbital welding processes.

BACKGROUND OF THE INVENTION

Modern plants for the production of electronic components such as semiconductors, integrated circuits and the like utilize a variety of gases and gas mixtures of extremely high purity and corrosivity in the manufacturing processes. The gases are often conducted over relatively great distances in a manufacturing facility from storage cylinders and tanks through various processing rooms for carrying out various operations such as the many etching steps required in the processing of the electronic components. The piping network is a significant component of the manufacturing facility. To produce the piping network, a great many piping components are assembled, and this assembly is generally carried out by welding sections of pipes to each other, to pipe fittings, to valves, and to the other components of the piping network.

Because of the corrosivity of the gases to be conducted through the piping network, stainless steel is the most commonly used material for the piping, fittings, etc., and electropolished stainless steel is the preferred type of material. One concern associated with welding such materials is the likelihood of inducing impurities and corrosion sites at the weld sites due to improper control of the weld. The weld sites are known to be corrosion sensitive points, and therefore the weld sites must be very carefully controlled in order to provide a high quality weld. And because of the great number of welds in any given facility, consistency is a very important factor in any technique used to control the welding process.

Modern welding systems used for welding stainless steels have included tungsten inert gas welding, metal inert gas welding and laser welding, and for pipeline welding, a process known as orbital welding has become very common. Orbital welding is a variation of a tungsten inert gas welding system using an inert gas flowing through the pipeline and through the welding head. The welding electrode is housed in a welding head which encircles the pipe, and the electrode orbits around the pipe within the welding head. Such an apparatus is shown, for example, in U.S. Pat. Nos. 5,136,134 and 5,223,686 to Benway, et al.

Orbital welding systems also use an inert shielding and/or purging gas for protecting the weld site from oxidation during the welding process. For example, argon is a commonly used gas and is caused to flow through the pipeline during the welding process. The inert gas is also used to flow through the orbital weld head around the weld site on the exterior of the pipeline.

Controlling the flow of the inert gas in the welding process is a very important aspect of the control system used, and a great number of different problems can arise when the inert gas is not properly controlled. U.S. Pat. No. 5,396,039 to Chevrel et al discloses a system for welding pipelines using an orbital welding technique with high purity argon as the purging gas flowing through the pipeline. U.S. Pat. No. 5,425,492 to Thode discloses another orbital welding process using an inert gas to protect the weld site from oxidation. The patent suggests adjusting the flow rate of the gas flow in response to pressure changes near the weld. Still another such system is disclosed in U.S. Pat. No. 5,304,776 to Buerkel, et al. This system applies a continuously variable pressure and vacuum within the pipes of the inert gas flowing through the piping network according to the position of the orbiting welding electrode and the spacing between the tip of the welding electrode and the molten weld puddle, in order to compensate for gravitational effects on the molten metal during the welding process.

These prior patents have disclosed techniques for controlling the nature of the welds produced. Industrial facilities often specify standards for welds, and conditions needed in order to attain compliance with the standard. For example, standards such as ANSI B31.3 specify acceptable weld contours and finishes, and defects must be removed and rewelded and re-examined for compliance. Moreover, welds are often cut out randomly for inspection, and if the welds do not comply with the standards, significant lengths of piping may have to be removed and replaced.

The pressure and flowrate of the inert gas flowing in the piping network are two important variables which contribute greatly to the quality of the welds produced in orbital welding systems. For example, a given flow rate must be maintained in order to adequately protect the weld site against oxidation. The actual flow rate is a function of several factors, but primarily the size of the pipe being welded. In addition, the pressure of the inert gas must be maintained within narrow limits during the welding process. While the flow rate may be set at the desired rate and will remain essentially constant, control of the pressure is more difficult in such welding processes for several reasons. For example, with each weld, the pipeline is increasing in length and thus internal volume. In addition, different lengths of pipe sections also provide different internal volumes. Further, for different diameters of pipe, different volumes are encountered. Thus, in order to maintain a uniform sweeping of a weld site by the purge gas, the flow rate of the purge gas may range from about 5 cfh (cubic feet per hour) to almost 600 cfh, depending on the size of the pipe, but the gas pressure must stay within a rather narrow, low pressure range of about 1–5 inches of water.

Leakage from the piping network during the welding is also a significant variable which causes variation in the pressure of the purge gas. For example, during the welding some gas is allowed to leak at the butt joint, but as the weld progresses around the pipe, the joint gradually closes until the leak is stopped. This causes a gradual increase in the pressure.

In a typical welding setup, to help maintain a constant pressure in the piping network, a restrictor is used at the end of the piping network remote from the weld, and a sensitive pressure gauge is used to control the pressure. A commonly used pressure gauge is known as a Magnehelic gauge, and is connected to a T-fitting generally downstream of the weld for monitoring the pressure. Process operators monitor changes in the pressure to enable them to adjust the flow of the purge gas with changes in the monitored pressure. Unfortunately, changing of the flow does not occur quickly enough in many cases to compensate for changing pressures. As a weld progresses around the pipe, any fluctuation in the pressure can also cause a sag in the weld upon pressure reduction, or a blowout of the weld upon pressure increase.

OBJECTS OF THE INVENTION

Thus, a primary object of the present invention is to provide an improved method and device for controlling a pipeline welding process.

Still another object of the invention is to provide an improved process technique for controlling the gas flow parameters of a purge gas in a pipeline welding process.

Another object of the invention is to provide an improved method for controlling the pressure of the purging gas in a pipeline welding process.

A further object of the invention is to provide an improved method for controlling the pressure of the purging gas by controlling the back pressure in a piping network.

Yet another object of the invention is to provide an improved method and device for maintaining an essentially uniform pressure of the purging gas in a piping network during welding.

Still a further object of the invention is to provide a method for controlling pipeline welding which can be automated for maximum uniformity.

Yet a further object of the invention is to provide a simple, inexpensive device for controlling the pressure of the purge gas in a pipeline welding system.

These and other objects and advantages of this invention will become apparent from a detailed consideration of the invention in relation to the following description and claims, taken with the accompanying drawings.

SUMMARY OF THE INVENTION

The present invention provides a method for controlling pressure of the purging gas in the pipeline through a very simple and very efficient system and device. A constant flow rate of inert gas is introduced into the pipeline upstream of the weld and caused to flow through the pipe from an inlet upstream of the weld to the downstream end of the piping network. At the downstream end, or at least downstream of the weld site, a purge restrictor is attached for restricting the outlet of the gas. A tee fitting also connects the pipe to a back pressure regulator by which a very accurate control of the inert gas pressure in the overall piping network is maintained. The tee fitting may be located anywhere in the pipeline, but is preferably close to the weld site.

In such welding systems, the bulk of the purge gas flowing through the piping network exits the network through the purge restrictor. This may be on the order of 75 percent up to 100 percent of the purge gas. The remainder of the gas ordinarily exits the piping network through the weld in progress, leaks in the system at fittings, tee joints, valves and the like. The present invention works on this remainder, since the flow restrictor is a constant.

In the simplest embodiment, the pressure regulator comprises a column of a liquid, preferably water, through which the inert gas is allowed to freely bubble as it exits from the pipeline. The water column is also adjustable so that the back pressure in the pipeline may be adjusted. Once this is set, the back pressure is maintained at a constant value while the flow volume may vary due to the conditions in the piping network. Because the back pressure remains constant and different volumes of gas may bubble through the water column, a very precise control of the gas pressure is achieved.

The invention also provides a very simple device for establishing the liquid column which comprises two, concentric cylindrical housings. The outer housing contains the liquid, preferably water, and the purge gas is introduced into the inner cylinder at the top. By adjusting the depth to which the inner cylinder is immersed into the water in the outer cylinder, the length of the water column is adjusted. The water passes through the inner cylinder, bubbles through the water and escapes through the upper portion of the outer cylinder to the atmosphere.

The gas pressure control established by this device is extremely precise and provides a very quick, accurate and precise control of the welding process. This control allows the welder to produce extremely consistent, high quality welds. Blowouts due to pressure surges and weld sags due to pressure drops are virtually eliminated. Further, a flowmeter at the purge gas inlet and a pressure gauge near the outlet may also be used to assist in initially setting the necessary flow rate and pressure in the pipeline, thus permitting a quick setup for the welding process. For very low flows on small diameter pipe, all of the purge gas may flow through the regulator.

In another embodiment, a partial electronic control may be established, wherein a pressure transmitter is connected to the gas outlet from the pipeline and functions to adjust the height of the water column as a function of the sensed pressure. Additionally, since the position of the orbiting welding head is also one factor affecting the back pressure, a position sensor for the weld head may be used with the pressure transmitter in order to adjust the back pressure as a function both of the sensed back pressure and the position of the weld head. In such a system, a servo motor can be used to increase or decrease the height of the water column and thus to increase or decrease the back pressure in the piping network.

In still another embodiment, rather than using a water column to adjust the back pressure, a control valve may be used which is electronically controlled by the pressure transmitter and the position sensor for the weld head.

In a full electronically controlled embodiment, the purge restrictor is replaced by an electronic control valve, and the passage of the inert gas through the control valve is controlled as a function of the sensed back pressure and the position of the control head.

DESCRIPTION OF THE DRAWINGS

The invention having been described in its general form above will now be described in greater detail in reference to the accompanying drawings, in which.

DETAILED DESCRIPTION OF PREFERRED EMBODIMENTS

Figure 1:
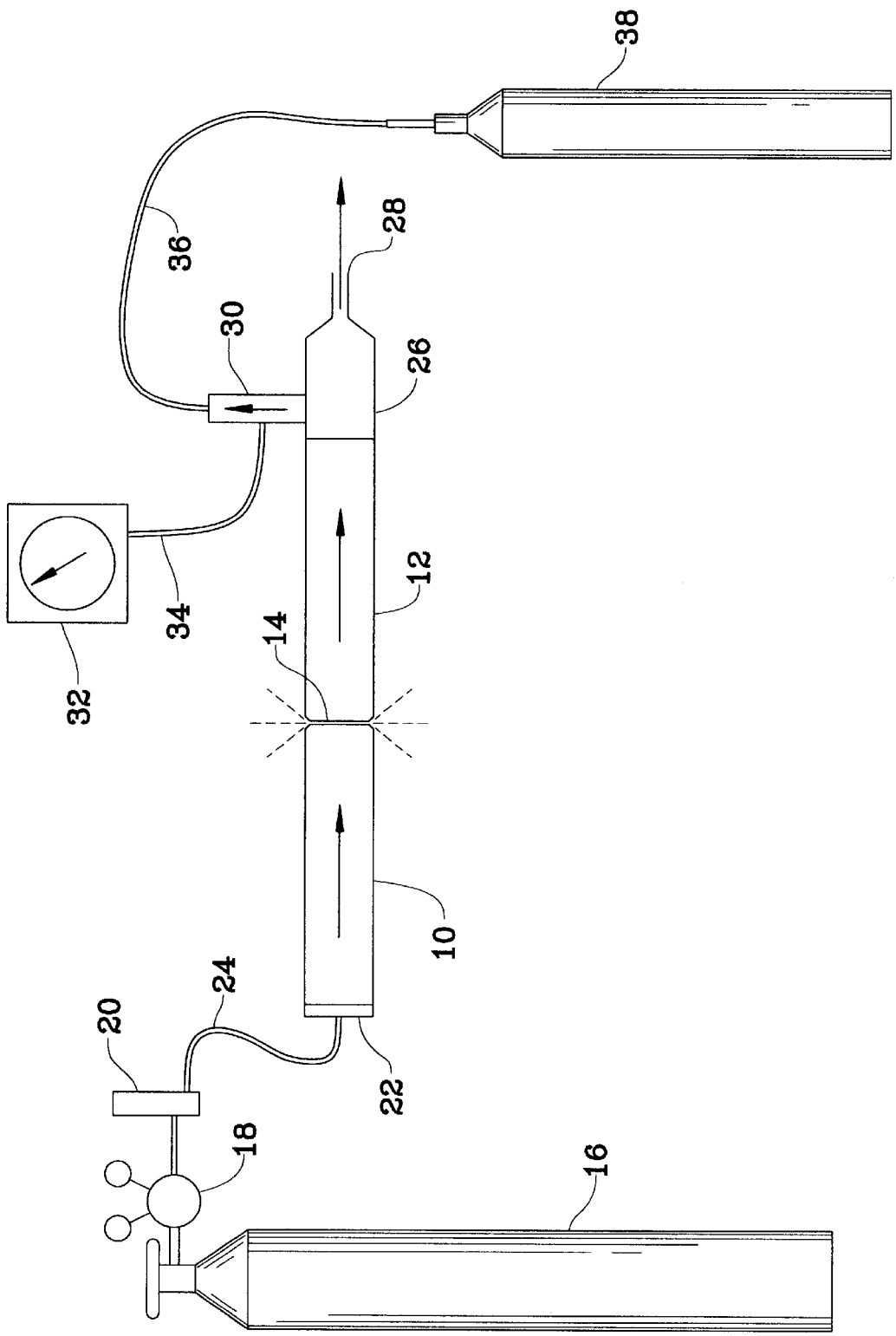
FIG. 1 is a schematic view of one embodiment a welding control system according to the invention.

The invention will now be described in greater detail with reference to the drawings. As seen in FIG. 1, the overall welding system is illustrated schematically for welding a section of pipe 10 to a piping network 12 at a butt joint 14. Although the drawing only illustrates one section of pipe, it will be understood that this represents an entire network to which the section of pipe 10 is being added. For convenience, the left end of the pipe 10 as seen in FIG. 1 will be termed to be upstream of the weld joint 14, while the right end will be termed the downstream end. The upstream end of the pipe 10 is connected to a source 16 of a purge gas, such as argon, and a pressure regulator 18 reduces the outlet pressure from the tank to a useable pressure, and flow regulator 20 serve to establish the flow rate of argon at the inlet to the pipe 10. A suitable connection 22 such as an end cap connects a supply line 24 to the pipe 10.

Downstream of the weld joint 14, the downstream end of the piping network 12 is closed by means of a flow restrictor 26 so that purge gas passing through the piping network 12 will exit the system through the restrictor 26. The flow restrictor is essentially a fixed size opening 28 through which the gas must pass, and the opening 28 is sized in accordance with the size of the pipeline 12 and the flow rate of the purge gas.

A fitting such as 30 extends from the restrictor 26 and has a pressure gauge 32 connected thereto through tubing 34, for reading the gas pressure in the piping network 12. The gauge 32 is preferably of the type known as a "Magnehelic" gauge which reads the gas pressure in inches of water, typically from 0–10 inches of water.

The fitting 30 may be located anywhere in the pipeline, however it is preferable that the fitting be close to the weld since pressure losses occur at greater distances.

A second tubing 36 extends from the fitting 30 to a back pressure regulating device 38 for maintaining a uniform and constant back pressure in the piping network. The back pressure regulator 38 is shown in greater detail in FIG. 2, and includes a first, outer cylinder 40 which is closed at the bottom and open at the top, and a second, inner cylinder 42 which is open at the bottom and closed at the top by means of a cap 44 to which the tubing 36 is connected. A rubber sleeve 45 connects the inner cylinder 42 with the outer cylinder 40, and may be secured by means of hose clamps 46, 48 thus providing a gas tight seal. A cylindrical flange 50 is secured to the bottom of the cylinder 40 in order to provide a stable base. Preferably the lower end of the inner cylinder 42 is bevelled as seen at 52. In addition, preferably a series of apertures 54 are provided in the cylinder 42, spaced from the bottom by about one-half inch. The bevelled edge 52 and the apertures 54 both serve to make the pressure in the system steady and reduce fluctuations.

A suitable liquid 56 fills the lower portion of the outer cylinder 40 to a suitable depth above the lower end of the inner cylinder 42 and above the apertures 54. The precise depth of the liquid is not critical, but the depth of the liquid cooperates with the position of the inner cylinder 42 to determine the back pressure on the purge gas entering through tubing 36. A vacuum breaker 58 may also be provided to prevent the possibility of liquid being siphoned back into the tubing 36. A series of apertures 60 are provided to allow gas to escape from the outer cylinder 40 to the atmosphere.

The liquid used in the cylinder 40 is preferably water although other liquids could be used if necessary under certain process conditions. The density of the liquid of course determines the back pressure in the inner cylinder 42 and thus in the piping network 12.

The welding is carried out using a conventional orbital welding system, and thus is only shown symbolically in the drawings. Preferably an orbital welding system is used, for example the type shown in the Benway patents referred to above and manufactured by the Cajon Company in Macedonia, Ohio.

In operation, for a one inch diameter pipe network being welded, the argon purge rate flow would typically be set at 60 CFH (cubic feet per hour) and the internal pressure in the pipe network would be set to be in the range of 1.5–2 inches of water, as determined by the pressure gauge 32. As the weld progresses, the electrode orbits around the pipe 10, gradually closing the butt joint 14 until it is completed. During this time, any increase in internal pressure in the piping network 12 causes excess argon to bubble through the back pressure regulator 38 while maintaining constant pressure in the network 12.

Figure 2:
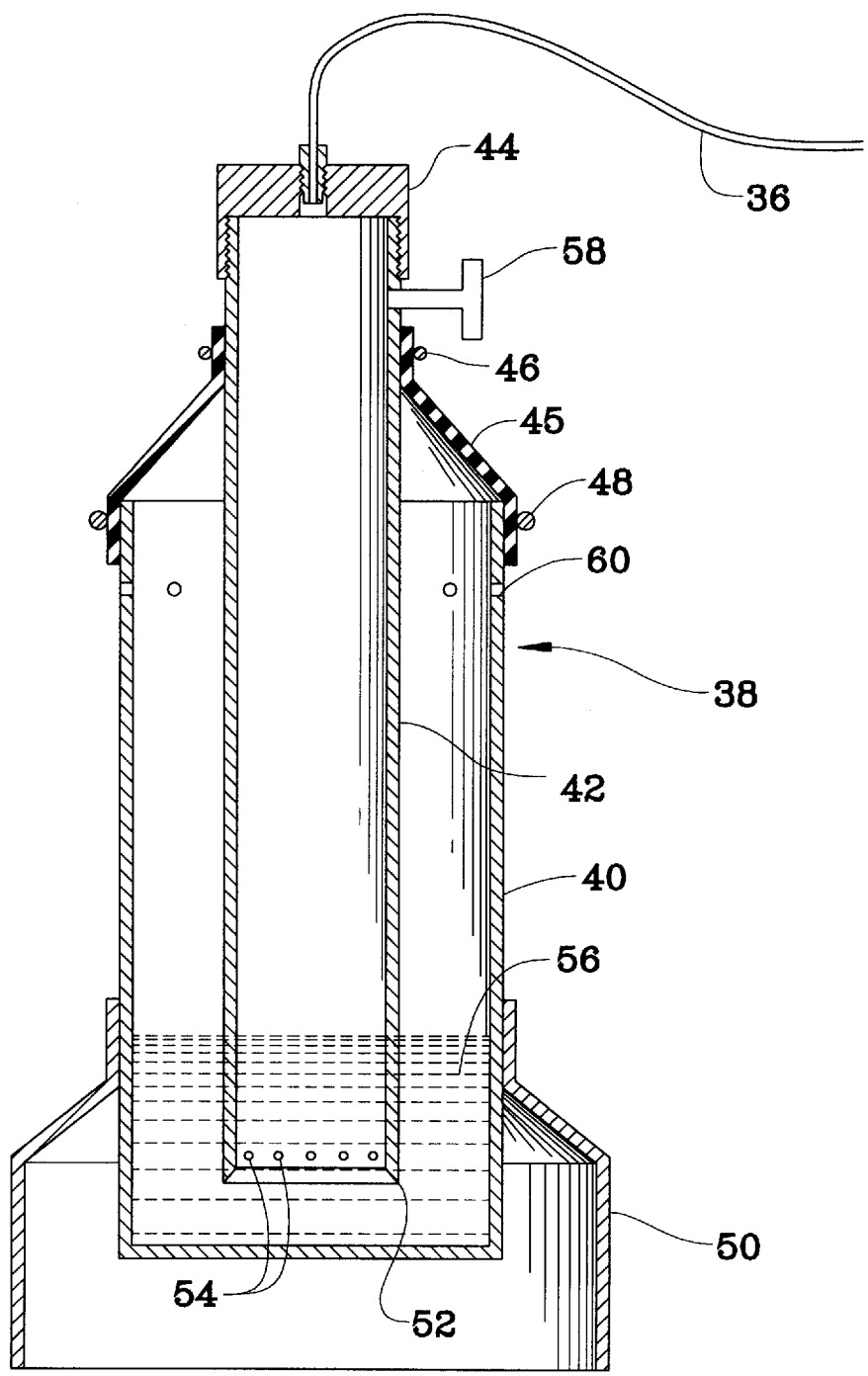
FIG. 2 is a longitudinal cross-sectional view of a device for controlling the back pressure.
Figure 3:
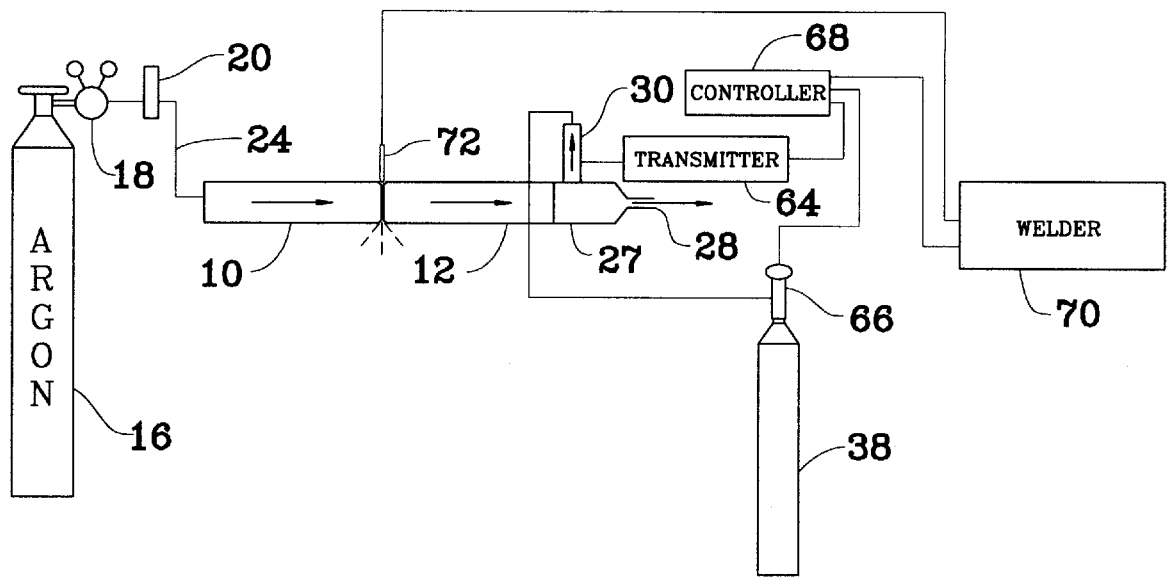
FIG. 3 is a schematic view of another embodiment of welding control system utilizing an electronically adjusted back pressure regulator.

In a variation on the embodiment of FIGS. 1 and 2, as shown schematically in FIG. 3, like components are shown by like reference characters. Instead of the Magnehelic pressure gauge 32, an electronic pressure transmitter 64 is provided and connected to the fitting 30. The transmitter 64 measures the pressure in the fitting 30 and sends an electronic signal to a servo motor 66 for raising or lowering the cylinder 42 and thereby adjusting the depth of the immersion of the cylinder 42 in the liquid 56 through any suitable mechanism. A signal may also be sent to the welding controller 68 and the welder 70 which is connected to the welding electrode 72. In this manner, the pressure variations may be used to control the welding done at the electrode 72.

Figure 4:
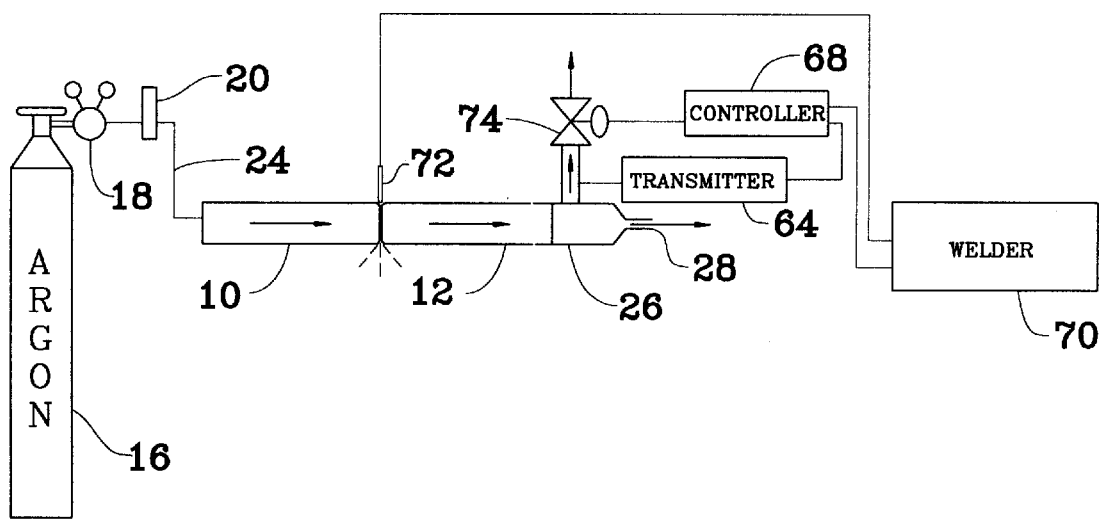
FIG. 4 is a schematic view of another embodiment of a welding control system which uses an electronically controlled valve for controlling the back pressure.

In another variation, as seen in FIG. 4, in lieu of the back pressure regulator 38, a control valve 74 is connected to the controller 68, and variations in the pressure in the network 12 are detected by the pressure transmitter 64 which in turn directs the opening or closing of the control valve 74 in accordance with the pressure fluctuations sensed by the pressure transmitter 64. This method has the disadvantage that it does not react as quickly to the pressure variations as the previous two embodiments.

Figure 5:
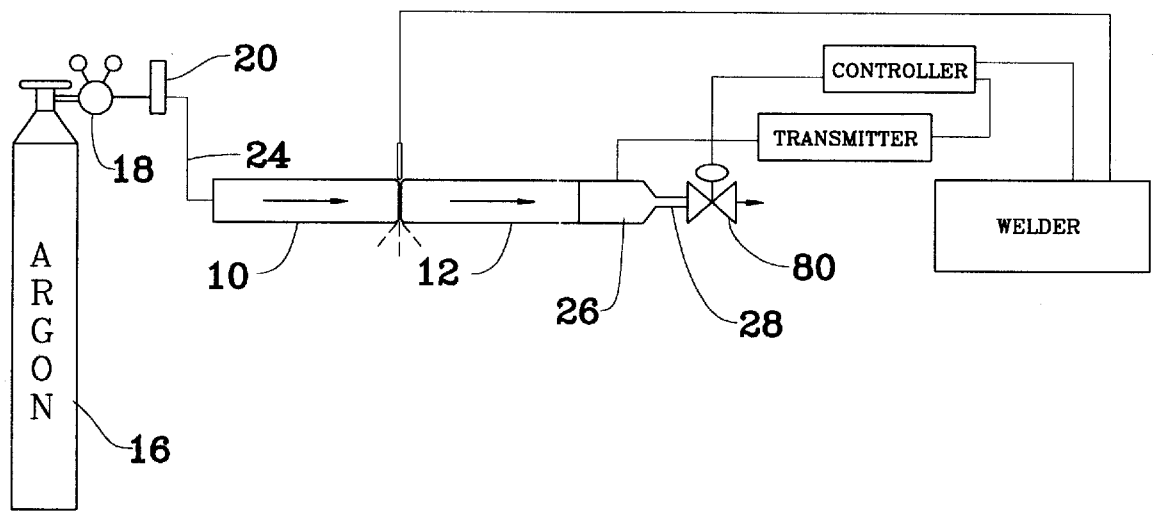
FIG. 5 is a schematic view of still another embodiment in which the flow restrictor is replaced by an electronically controlled valve.
Figure 6:
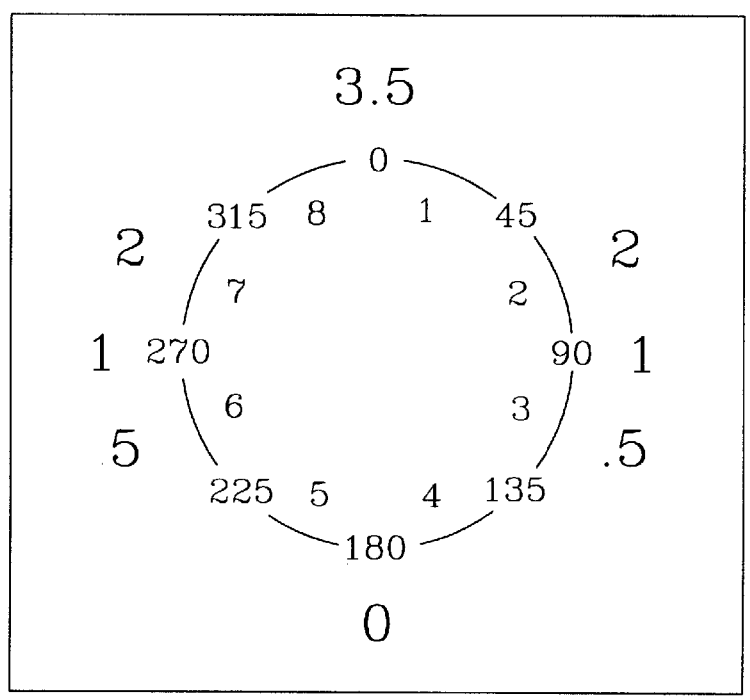
FIG. 6 is a schematic view showing how the pressure may vary as a function of the position of the welding electrode.

In another embodiment illustrated schematically in FIGS. 5 and 6, a control valve 80 is placed downstream of the flow restrictor 28, and is connected to the controller 68. The pressure transmitter 64 is also connected to the controller 68, as is the welder 70. The controller 68 enables opening or closing the control valve 80 in response to back pressure changes detected by the pressure transmitter 64 as well as by changes in the position of the welding electrode 72. FIG. 6 is a diagram showing the relative position of the welding electrode from 0° to 360° (the numbers on the circle) and showing how the measured back pressure (the outer numbers) may vary with the orbit of the electrode. Reference points (the inner numbers) may also be set for indexing the welding controller. The back pressure may be controlled as a function of the position alone or in combination with the measured back pressure.

While this invention has been described as having certain preferred features and embodiments, it will be understood that it is capable of still further variation and modification without departing from the spirit of the invention, and this application is intended to cover any and all variations, changes, modifications, adaptations as may fall within the spirit of the invention and the scope of the appended claims.

I claim:

1. A method for controlling the purge gas pressure in an orbital pipe welding process comprising introducing a purge gas into the pipe being welded and causing said purge gas to flow through said pipe at a substantially constant rate, causing said purge gas to leave said pipe through a restriction, causing at least a portion of said flowing purge gas from said pipe to flow though a back pressure regulator capable of continuously compensating for back pressure variations in said pipe without allowing pressure buildup or reduction in said pipe during the welding thereof.

2. A method for controlling the purge gas flow as in claim 1 and including causing said portion of said purge gas to flow through a column containing liquid.

3. A method for controlling the purge gas flow as in claim 2 and wherein the height of said liquid column is adjustable.

4. A method for controlling the purge gas flow as in claim 3 and wherein said purge gas is argon and said liquid is water.

5. A method for controlling the purge gas flow as in claim 3 and including measuring the pressure of the purge gas in said pipe, and adjusting the back pressure in response to variations in the measured pressure.

6. A method for controlling the purge gas flow as in claim 5 and including adjusting the back pressure by adjusting the effective height of said liquid in said column.

7. A system for welding pipe onto a piping network at a joint comprising means for introducing an inert purging gas under pressure at a substantially constant flow rate at one end of said pipe away from said joint, a flow restriction at the end of said piping network away from said joint, means for maintaining a substantially constant back pressure of said inert purging gas in said piping network, and means for diverting a minor portion of said inert purging gas flowing through said piping network into and through said constant back pressure maintaining means, whereby any changes in back pressure occurring in said piping network cause a greater or lesser amount of said inert purging gas to flow through said constant back pressure maintaining means.

8. A pipe welding system as in claim 7 and including a flow meter for establishing a constant flow of said inert purging gas flowing into said piping network within the range of about 5 to 600 cfh and a pressure in the range of about 1 to 10 inches of water.

9. A pipe welding system as in claim 8 and including an orbital welder for welding said pipe to said piping network.

10. A pipe welding system as in claim 9 and including means for varying the backpressure in said piping network.

11. A pipe welding system as in claim 10 and wherein said constant backpressure maintaining means comprises an adjustable water column, and means for conducting said minor portion of said inert purging gas to said water column whereby increases in the back pressure of said inert purging gas cause a portion of said inert purging gas to flow through said water column.

12. A pipe welding system as in claim 11 and wherein said adjustable water column comprises concentric inner and outer cylinders partially filled with water, the inner cylinder being immersed into the water to an adjustable extent, means conducting said minor portion of purging gas into said inner cylinder and into contact with said water, and means allowing the exit of any of said minor portion of purging gas from said outer cylinder after said minor portion of purging gas passes through said water.

13. A device for controlling the backpressure of an inert purging gas flowing through the pipeline in an orbital pipeline welding system, said device comprising inner and outer concentric cylinders, said outer cylinder being closed at the bottom and containing a liquid and being open to the atmosphere at the top, said inner cylinder being closed at the top and open at the bottom and having its open bottom end immersed into said liquid, means for conveying an inert purging gas under pressure into the closed top of said inner cylinder and means for allowing the escape of inert purging gas from said outer cylinder above the surface of said liquid.

14. A device for controlling the backpressure of an inert purging gas as in claim 13 and wherein said inner cylinder has a bevelled edge at its lower end.

15. A device for controlling the backpressure of an inert purging gas as in claim 14 and wherein said inner cylinder has a plurality of apertures formed therein and spaced from the bottom of said cylinder for allowing the escape of inert purging gas therethrough.

16. A device for controlling the backpressure of an inert purging gas as in claim 15 and wherein said inner cylinder has a bevelled edge at its lower end.

17. A device for controlling the backpressure of an inert purging gas as in claim 16 and including a vacuum break near the top of said inner cylinder for preventing aspiration of said liquid from said cylinder.

18. A device for controlling the backpressure of an inert purging gas as in claim 13 and including a rubber boot sealing the top of said outer cylinder to the wall of said inner cylinder.

\* \* \* \* \*